(12) United States Patent
Currivan et al.

(10) Patent No.: US 7,673,192 B2
(45) Date of Patent: Mar. 2, 2010

(54) SYSTEM AND METHOD OF UNCORRELATED CODE HOPPING IN A COMMUNICATIONS SYSTEM

(75) Inventors: Bruce J. Currivan, Dove Canyon, CA (US); Thomas J. Kolze, Phoenix, AZ (US); Kevin L. Miller, Lawrenceville, GA (US); Richard S. Prodan, Niwot, CO (US); Jonathan S. Min, Fullerton, CA (US)

(73) Assignee: Broadcom Corporation, Irvine, CA (US)

( * ) Notice: Subject to any disclaimer, the term of this patent is extended or adjusted under 35 U.S.C. 154(b) by 894 days.

(21) Appl. No.: 11/489,538

(22) Filed: Jul. 20, 2006

(65) Prior Publication Data

US 2007/0061642 A1 Mar. 15, 2007

Related U.S. Application Data

(60) Provisional application No. 60/700,676, filed on Jul. 20, 2005.

(51) Int. Cl.
*H04J 13/06* (2006.01)
(52) U.S. Cl. ........................ 714/701; 375/132
(58) Field of Classification Search ............ 375/132; 714/701
See application file for complete search history.

(56) References Cited

U.S. PATENT DOCUMENTS

| | | | |
|---|---|---|---|
| 6,606,342 B1 * | 8/2003 | Banister | 375/130 |
| 6,636,552 B1 * | 10/2003 | Banister | 375/130 |
| 6,778,611 B1 | 8/2004 | Ungerboeck | |
| 6,944,211 B2 * | 9/2005 | Mower et al. | 375/150 |
| 6,992,992 B1 * | 1/2006 | Cooper et al. | 370/324 |
| 7,035,310 B1 * | 4/2006 | Roberts | 375/132 |
| 7,082,448 B2 * | 7/2006 | Cho | 708/250 |
| 7,089,274 B2 * | 8/2006 | Smeets | 708/250 |
| 7,356,068 B2 * | 4/2008 | Park et al. | 375/132 |
| 7,386,026 B1 * | 6/2008 | Gold | 375/130 |
| 2003/0185174 A1 | 10/2003 | Currivan et al. | |
| 2004/0068748 A1 | 4/2004 | Currivan et al. | |
| 2005/0002462 A1 | 1/2005 | Ungerboeck | |
| 2005/0097617 A1 | 5/2005 | Currivan et al. | |
| 2005/0163196 A1 | 7/2005 | Currivan et al. | |

\* cited by examiner

*Primary Examiner*—Stephen M Baker
(74) *Attorney, Agent, or Firm*—Sterne, Kessler, Goldstein & Fox, P.L.L.C.

(57) ABSTRACT

A system and method are used to provide uncorrelated code hopping in a communications system. A multi-bit linear shift register receives data and clocks the data fifteen times. A word assembler receives the shifted data and outputs a fifteen bit word. A mixer mixes the fifteen bit word with an numerical value of active codes to generate a mixed signal. A divider divides the mixed signal to produce a divided signal. A truncator truncates the divided signal to its seven most significant bits to produce a pseudo random hop number. A code matrix shifter circularly shifts the active codes in a code matrix based on the pseudo random hop number to produce a circularly shifted code. A transmitter transmits the circularly shifted code matrix.

16 Claims, 13 Drawing Sheets

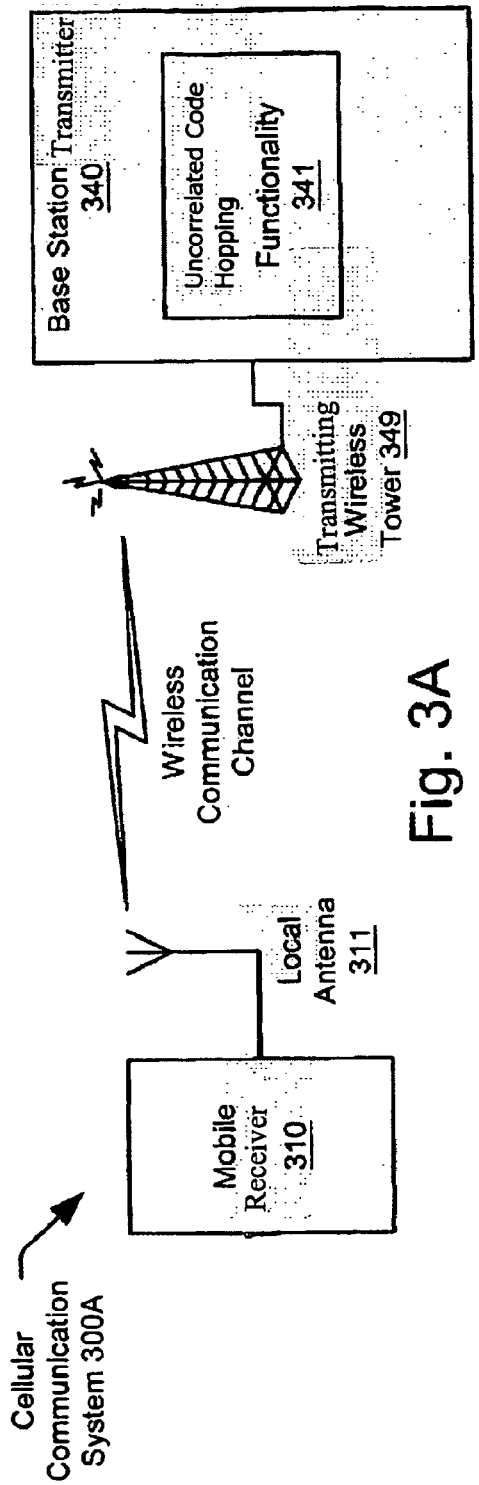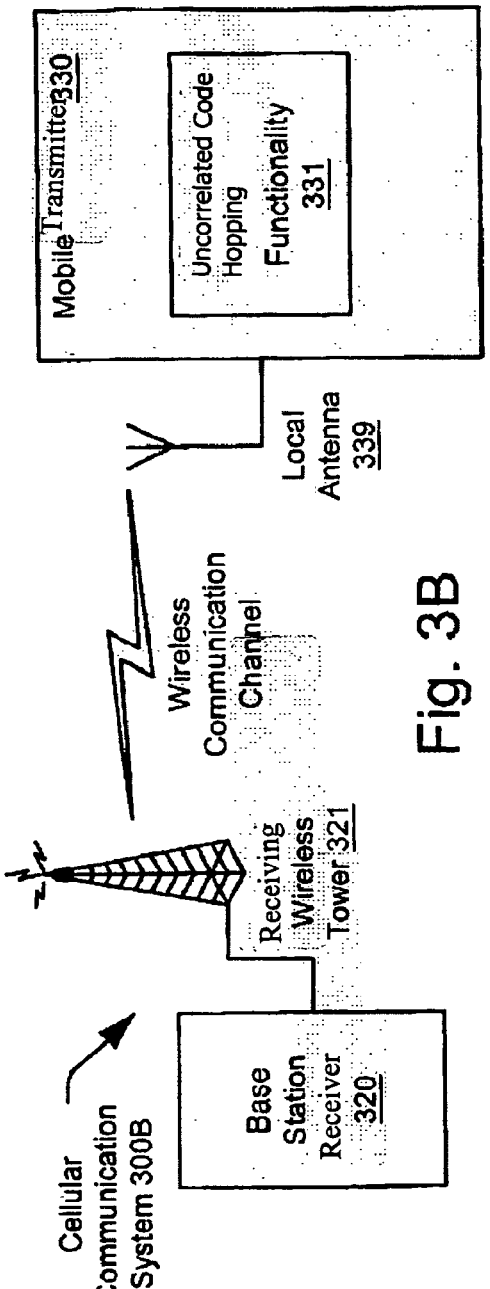

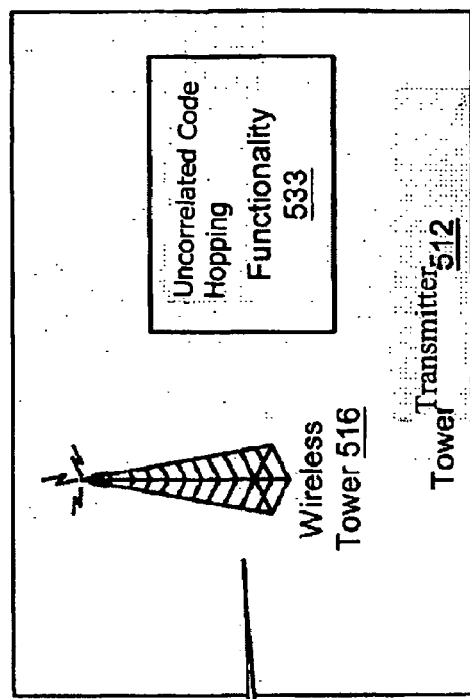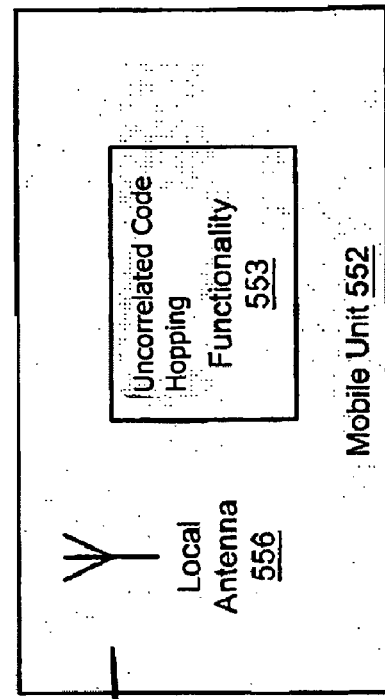
Fig. 5A
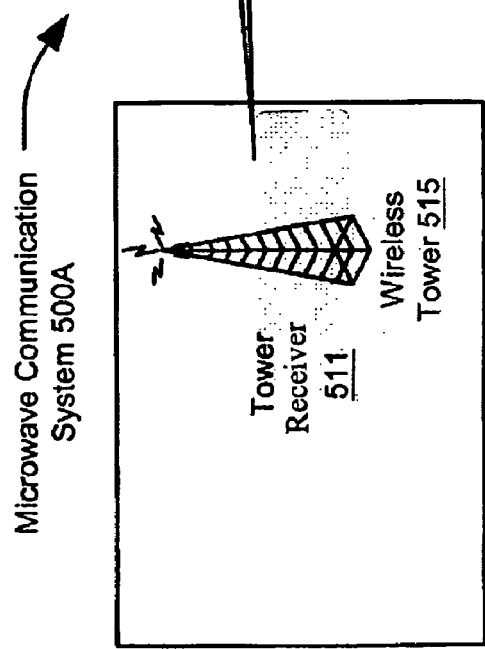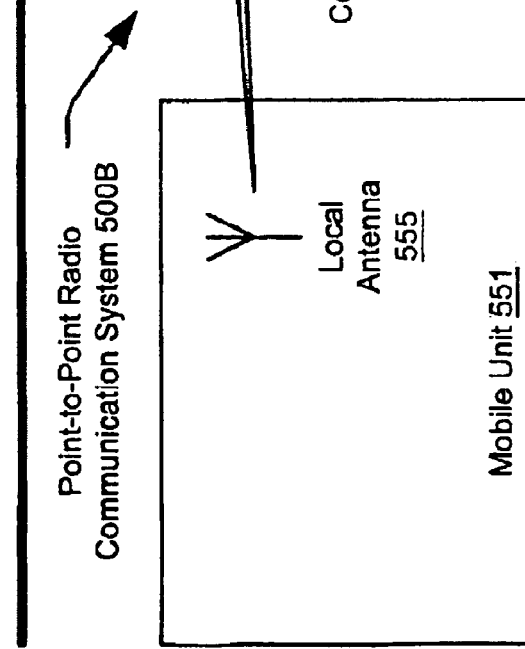
Fig. 5B

SYSTEM AND METHOD OF UNCORRELATED CODE HOPPING IN A COMMUNICATIONS SYSTEM

CROSS REFERENCE TO RELATED APPLICATION

This application claims benefit under 35 U.S.C. §119(e) to U.S. Provisional Application No. 60/700,676, filed Jul. 20, 2005, which is incorporated by reference herein in its entirety.

BACKGROUND

1. Field of the Invention

The present invention is related to an uncorrelated code hopping of a code matrix used to transmit data in a communications system.

2. Related Art

The existing data over cable standard is DOCSIS 2.0 includes a Synchronous Code Division Multiple Access (S-CDMA) modulation as one of several modulation options. Code hopping refers to a method whereby a modified code matrix is used for transmission at each spreading interval. The modified code matrix is produced via circular shifting of the codes in the original code matrix based on a pseudo-randomly generated shift number. In this shifting process, each code or row in the matrix is left unchanged, but the ordering of the codes or rows is altered. The DOCSIS S-CDMA scheme includes 128 spreading codes, where each spreading code (or waveform) is a row in the 128 bit×128 bit code matrix specified in the DOCSIS standard. A single row of the code matrix is a sequence of 128 bits of either 1 or −1. Each bit in the code is sometimes referred to as a chip. No two rows of the code matrix are the same. For example, if a first row in the code matrix is all 1s, the next row in the code matrix is a pseudo-random set of 1's and −1's. The rows are orthogonal, such that a dot product of a row with any other row equals zero. A dot product refers to an operation on two vectors wherein an element by element multiplication occurs, followed by a summing. This also means the rows are delta correlated with each other and they are zero correlated with any other row.

The rows of the code matrix are used for transmission of a symbol, e.g., a quadrature amplitude modulated (QAM) symbol, such as up through 256 QAM. Using the DOCSIS S-CDMA scheme, 128 QAM symbols can be transmitted at the same time. Each symbol is a complex value, because it has both in-phase and quadrature components, such that X and Y are its real and imaginary parts, respectively. To transmit the QAM symbol using S-CDMA, the symbol is multiplied by one of the rows of the code matrix. The product is then transmitted serially over a channel, where it may be summed with modulated QAM symbols utilizing the other rows of the code matrix. The rows of the code matrix remain orthogonal even after they are multiplied by different (or the same) complex constants, such as the QAM symbol complex values. There are 128 rows in the code matrix, and since the rows remain orthogonal even with multiplication by the QAM symbols, all 128 rows (each multiplied by its associated QAM symbol) can be transmitted simultaneously, thus conveying 128 QAM symbols at the same time. The transmission of 128 QAM symbols at the same time can also be parsed such that more than one user is transmitting, each user employing a different subset of the 128 spreading codes. This is sometimes referred to as multiple access. This is in contrast to pure time division multiple access (TDMA), wherein only one QAM symbol is sent at a time.

In DOCSIS the symbols are sent at a maximum chip rate of 5.12 mega chips per second, which provides 5.12 million QAM symbols per second when all 128 spreading codes are utilized. Up to 64 users using as few as two codes per user can transmit at the same time, as one example of multiple access. If 128 symbols are sent at the same time all the symbols might be from one user (e.g., cable modem), or the symbols might be from 64 cable modems, each utilizing a different two of the 128 spreading codes, as two extreme cases.

One problem associated with transmission of the symbols derives from the unequal response of the codes to narrowband interference. The frequency response (or spectrum) of each code is not flat when the discrete Fourier transform (DFT) of the sequence is calculated. The spectrum has peaks and valleys, and may appear random. There may be narrowband interference in the channel, an impairment common in cable networks. If narrowband interference occurs at a valley in the spectrum of a particular spreading code, then a reduction of the impact created by the interference can occur, which is desirable. But if the interference occurs at a peak in the frequency response of that particular code, this is undesirable because it will amplify the interference. Another code has another random sequence of peaks and valleys, which results in a different response to that particular narrow band interference. Thus, there is inequality in transmission. Some of the codes have a good response, e.g., they are not very responsive to that narrow band interference, while other codes become degraded by the narrow band interference. This is in contrast to a goal of these systems, which is for all the users to receive equal performance. Also, due to the nonlinear relationship between bit error rate (BER) and signal-to-noise ratio (SNR), the system's average BER will be dominated by the codes having the poorest performance.

In order to improve performance, code shuffling or hopping has been introduced into DOCSIS, instead of assigning the spreading codes (i.e., rows) in the same pattern in repeated transmissions. Consider the full code matrix, with rows enumerated 0-127, with row 0 at the bottom of the matrix and row 127 at the top of the matrix. (This is the row numbering method used in DOCSIS.) We will refer to "code i" as the ith row of the original spreading matrix, starting with code 0 at the bottom. As the matrix is permuted, the codes will in general move to different rows in the modified spreading matrix. For the permutation (hopping) of the code matrix, a pseudo-random number is generated and applied so that the ordering of the rows in the matrix is modified. For example, the pseudo-random number 0 would result in the original matrix with rows 0-127 unchanged. In another example, a pseudo-random number 10 would circularly shift every row or code up by 10. In the example when the rows of the code matrix are circularly shifted by 10, then the code matrix shifts codes 0, 1, 2, 3, . . . , 117 to the top, with code 117 occupying the topmost row, and codes 118, 119, . . . , 127 at the bottom, with code 118 occupying the bottommost row. (A more detailed illustration is given later.) Through these permutations, an averaging effect occurs allowing each user which only has allocation of a subset of the spreading codes to get substantially equal performance over time. Thus, if a row of the code matrix experiences interference during one transmission, e.g., a QAM symbol gets degraded, desirably the next transmission gets better performance, such that it just averages out over time and any errors can be corrected by the forward error correction (FEC) decoder. A user which repeatedly has a subset of codes allocated for its transmissions does not get "stuck" with a poor performing code or codes.

In DOCSIS, a maximum of 40,000 symbols are transmitted per second on each one of the codes. Since there are up to 128 codes being sent at the same time, the maximum DOCSIS symbol rate is 5.12 million QAM symbols per second. This time interval for transmitting a spreading code, 40,000th of a second, is called the spreading interval. With code hopping, the code matrix numbering (i.e., assignment) starts over using a different configuration of the code matrix (which can be thought of as a modified code matrix), i.e., the code hopping is performed on each spreading interval. Thus, after each use of the code matrix, the rows of the code matrix are permutated through another circular shifting of the rows within the code matrix.

Thus, code hopping refers to a systematic re-ordering of the rows of the original spreading matrix C, such that at each spreading interval k, a new code matrix $C_k$ is produced. A pseudo-random number generator determines a cyclic shift of a subset of the rows of the original matrix C. In code hopping, using selectable active codes mode 1 (DOCSIS 2.0 mode), when the number of active codes $N_a$<128, the cyclic codes are hopped (cyclically shifted), while code 0, the all 1s code, which is considered a less desirable code due to its poor spreading characteristics, remains fixed at the bottom of the code matrix.

The unused codes are located in the (128−$N_a$) bottom rows of the hopped matrix $C_k$. Thus, for $N_a$<127, the set of unused codes changes at each spreading interval. When $N_a$=128, all codes are hopped, including code 0.

The hopped spreading matrix is defined by:

$$C_k = \begin{bmatrix} C_{f(k,127),127} & C_{f(k,127),126} & \cdots & C_{f(k,127),0} \\ C_{f(k,126),127} & C_{f(k,126),126} & \cdots & C_{f(k,126),0} \\ \cdots & \cdots & \cdots & \cdots \\ C_{f(k,0),127} & C_{f(k,0),126} & \cdots & C_{f(k,0),0} \end{bmatrix}$$

where, $$f(k, i) = \begin{cases} \text{modulo}(128 - \text{lfsr\_out}(k) + i), 128) N_a = 128, 0 \le i \le 127 \\ \text{modulo}(126 - \text{lfsr\_out}(k) + i), 127) + 1, N_a < 128, 1 \le i \le 127 \end{cases}$$

The code matrix elements $C_{i,j}$ are the elements of the original code matrix C, k indicates the spreading interval, i indicates the row in the code matrix, lfsr_out is a pseudo-random number, and Na is the number of active codes.

In one example, instead of using all 128 codes, only a subset will be needed. For example 128 total−16 unused=108 active rows or 128 total−8 unused=120 active rows. In the latter example, 120 codes are active or used and 8 of codes are inactive or unused.

Although the rows in the code matrix are orthogonal to each other, a code in one row in the code matrix is nearly equal to a code in the next row, except just shifted by one. One exception is that the bits in the last row of the code matrix are not shifted. Thus, 127 out of 128 of the rows are simply a shift of the previous row or the code in the next row in the other direction. Because each row is so closely related to its neighboring row in its structure, the spectra of neighboring rows in the code matrix are very nearly the same, even though in the time domain the spreading codes are orthogonal. Thus, the maximums and minimums (e.g., peaks and valleys) in the spectra are almost identical between one row and the next row. Therefore, the neighboring rows will experience similar impacts from interference during transmissions, and since neighboring rows are assigned to users in DOCSIS 2.0 which are only allocated a contiguous subset of the rows, this means that such users could be allocated a subset of rows such that all are more impaired by a given narrowband interference than many other of the rows in the code matrix. Furthermore, this inequality between rows may persist over multiple transmissions for this user if the user is allocated the same or a similar subset of rows repeatedly.

The above code hopping scheme typically also uses a correlated hopping sequence. The code achieved after a first hop is related to a code achieved after a next hop. Because of this, although there is shifting in the rows of the code matrix when code hopping is enabled, the rows are not being shifted far enough from their previous positions. Thus, not enough randomness is being introduced into the code matrix between transmissions, which results in any narrowband interference to still introduce inequality in communication fidelity.

Therefore, what is needed is a system and method that would allow for larger and uncorrelated code hopping, which can increase equality in transmissions.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 3A is a system diagram illustrating an embodiment of a cellular communication system.

FIG. 3B is a system diagram illustrating another embodiment of a cellular communication system.

FIG. 5A is a system diagram illustrating an embodiment of a microwave communication system.

FIG. 5B is a system diagram illustrating an embodiment of a point-to-point radio communication system.

Figure 1:
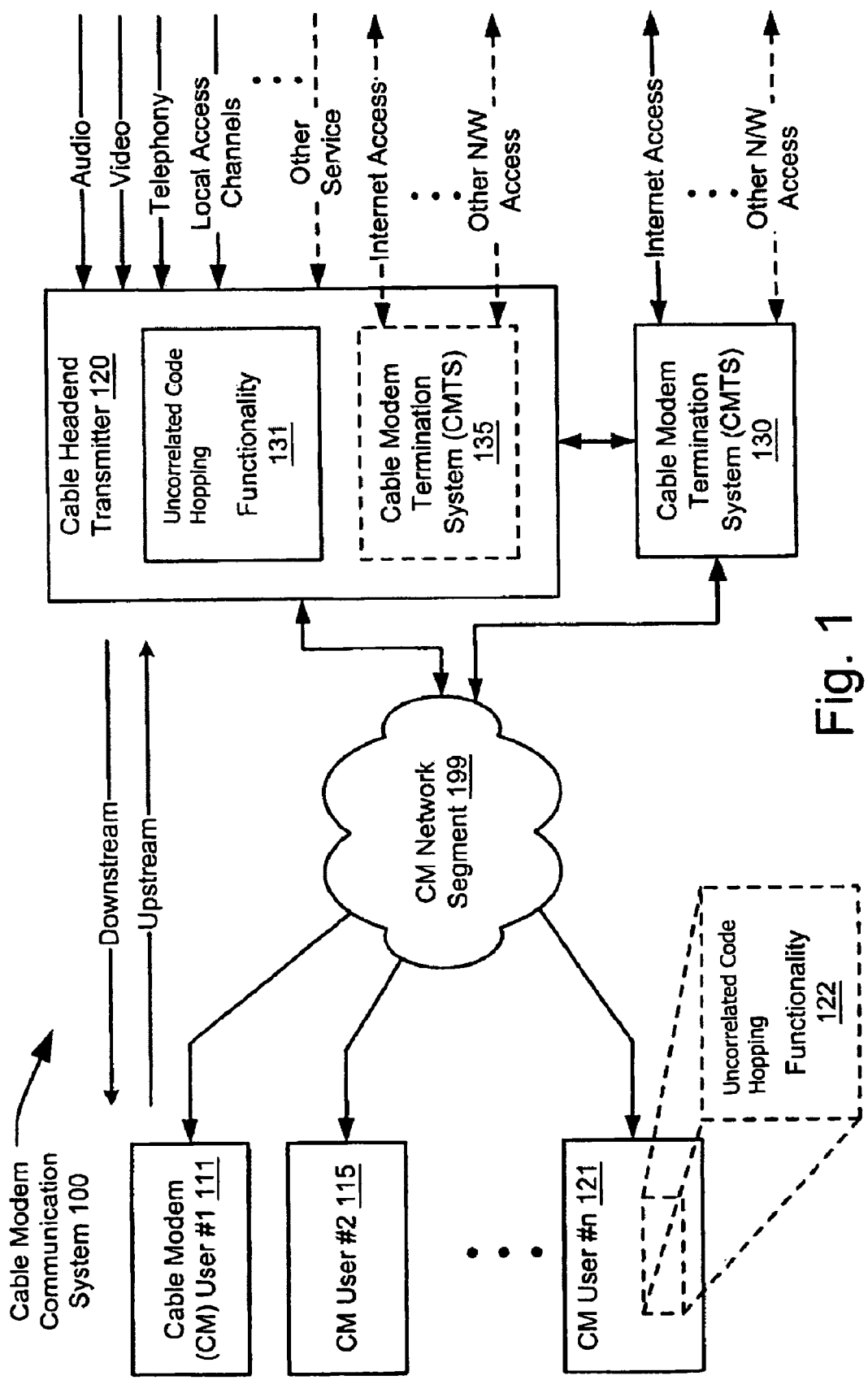
FIG. 1 is a system diagram illustrating an embodiment of a cable modem (CM) communication system.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Overview

This specification discloses one or more embodiments that incorporate the features of the invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

One or more embodiments of the present invention provide a system and method that results in uncorrelated code hopping between transmissions of code based on circularly shifting a code matrix using a pseudo random (hop) number generated by a pseudo random (hop) number generating system between each transmission.

Exemplary Communications Systems Employing Uncorrelated Code Hopping

FIG. 1 is a system diagram illustrating an embodiment of a cable modem (CM) communication system 100, according to the present invention.

The CM communication system includes a number of CMs (shown as a CM user #1 111, a CM user #2 115, ..., and a CM user #n 121) and a cable modem termination system (CMTS) CMTS 130. The CMTS 130 is a component that exchanges digital signals with CMs on a cable network.

Each of a number of CM users, shown as the CM user #1 111, the CM user #2 115, and the CM user #n 121, is able to communicatively couple to a CM network segment 199. A number of elements may be included within the CM network segment 199. For example, routers, splitters, couplers, relays, and amplifiers may be contained within the CM network segment 199 without departing from the scope and spirit of the invention.

The CM network segment 199 allows communicative coupling between a CM user and a cable headend transmitter 120 and/or a CMTS 130. In some embodiments, a cable CMTS is in fact contained within a headend transmitter. In other embodiments, the functionality of the cable CMTS and the headend transmitter are represented as two distinct functional blocks so that their respective contribution may be more easily appreciated and understood. This viewpoint is shown in the situation where the CMTS 130 is pictorially shown as being located externally to a cable headend transmitter 120. In the more common representation and implementation, a CMTS 135 is located within the cable headend transmitter 120. The combination of a CMTS and a cable headend transmitter may be referred to as being the "cable headend transmitter;" it then being understood that the cable headend transmitter supports the CMTS functionality. The CMTS 130 may be located at a local office of a cable television company or at another location within a CM communication system. In the following description, the CMTS 130 is used for illustration. The same functionality and capability as described for the CMTS 130 may equally apply to embodiments that alternatively employ the CMTS 135. The cable headend transmitter 120 is able to provide a number of services including those of audio, video, telephony, local access channels, as well as any other service known in the art of cable systems. Each of these services may be provided to the one or more CM users 111, 115, ..., and 121.

In addition, through the CMTS 130, the CM users 111, 115, ..., 121 are able to transmit and receive data from the Internet and/or any other network to which the CMTS 130 is communicatively coupled. The operation of a CMTS, at the cable-provider's head-end, may be viewed as providing many of the same functions provided by a digital subscriber line access multiplexer (DSLAM) within a digital subscriber line (DSL) system. The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users, and typically control servers for a protocol called Data Over Cable Service Interface Specifications (DOCSIS), the major standard used by U.S. cable systems in providing Internet access to users.

The downstream information flows to all of the connected CM users 111, 115, ..., 121. This may be viewed to be in a manner that is similar to that manner within an Ethernet network. The individual network connection, within the CM network segment 199, decides whether a particular block of data is intended for it or not. On the upstream side, information is sent from the CM users 111, 115, ..., 121 to the CMTS 130. On this upstream transmission, the users within the CM users 111, 115, ..., 121 to whom the data is not intended do not see that data at all. As an example of the capabilities provided by a CMTS, the CMTS will enable as many as 1,000 users to connect to the Internet through a single 6 MHz channel. Since a single channel is capable of 30-40 megabits per second of total throughput, this means that users may see far better performance than is available with standard dial-up modems. Embodiments implementing the present invention are described below and in the various Figures that show the data handling and control within one or both of a CM and a CMTS within a CM system that operates by employing S-CDMA (Synchronous Code Division Multiple Access).

The CMs of the CM users 111, 115, ..., 121 and the CMTS 130 communicate synchronization information to one another to ensure proper alignment of transmission from the CM users 111, 115, ..., 121 to the CMTS 130. This is where the synchronization of the S-CDMA communication systems is extremely important. When a number of the CMs all transmit their signals at a same time, such that these signals are received at the CMTS 130 on the same frequency and at the same time, they must all be able to be properly de-spread and decoded for proper signal processing.

Each of the CMs users 111, 115, . . . , 121 is located a respective transmit distance from the CMTS 130. In order to achieve optimum spreading diversity and orthogonality for the CMs users 111, 115, . . . , 121 to transmission of the CMTS 130, each of the CM transmissions must be synchronized so that it arrives, from the perspective of the CMTS 130, synchronous with other CM transmissions. In order to achieve this goal, for a particular transmission cycle, each of the CMs 111, 115, . . . , 121 will typically transmit to the CMTS 130 at a respective transmission time, which will likely differ from the transmission times of other CMs. These differing transmission times will be based upon the relative transmission distance between the CM and the CMTS 130. These operations may be supported by the determination of the round trip delays (RTPs) between the CMTS 130 and each supported CM. With these RTPs determined, the CMs may then determine at what point to transmit their S-CDMA data so that all CM transmissions will arrive synchronously at the CMTS 130.

Embodiments of the present invention enable uncorrelated code hopping when transmitting from the CMTS 130, as shown in a functional block 131. Embodiments of the present invention may also be implemented to support uncorrelated code hopping within any one of the CMs 111, 115, . . . , 121. The particular implementation of uncorrelated code hopping is shown as a functional block 122 within the CM 122, yet it is understood that the uncorrelated code hopping functionality may also be supported within the other CMs as well. The CMTS 130 receives an input spread signal and is operable to perform despreading. The CMTS 130 is operable to employ a pseudo random number generator (PRNG) to assist in the uncorrelated code hopping.

Figure 2:
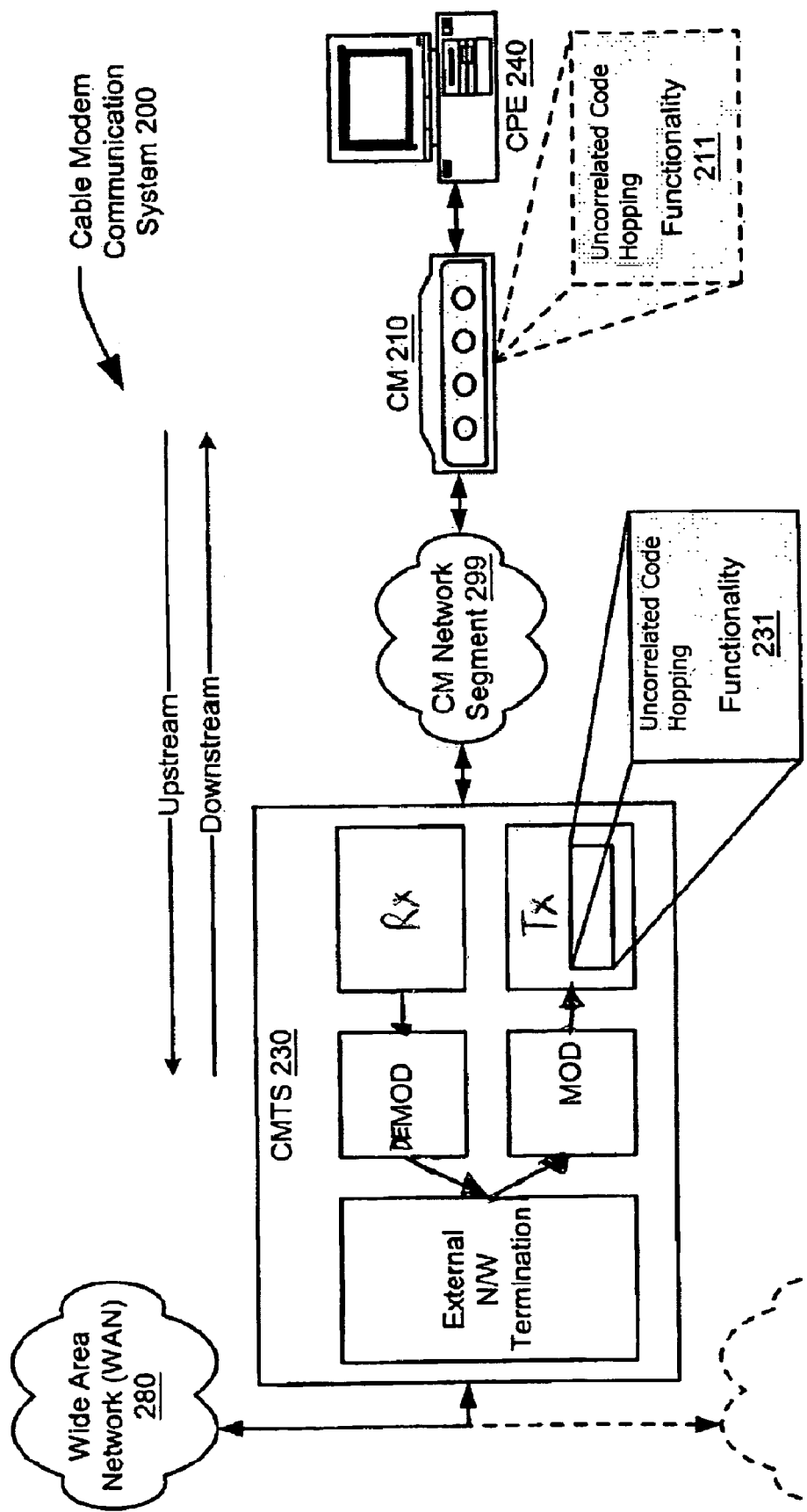
FIG. 2 is a system diagram illustrating another embodiment of a CM communication system.

FIG. 2 is a system diagram illustrating another embodiment of a CM communication system 200, according to the present invention. From certain perspectives, FIG. 2 may be viewed as a communication system allowing bi-directional communication between a customer premise equipment (CPE) 240 and a network. In some embodiments, the CPE 240 is a personal computer or some other device allowing a user to access an external network. The network may be a wide area network (WAN) 280, or alternatively, the Internet 290 itself. For example, the CM communication system 200 is operable to allow Internet protocol (IP) traffic to achieve transparent bi-directional transfer between a CMTS-network side interface (CMTS-NSI: viewed as being between the CMTS 230 and the Internet 290) and a CM to CPE interface (CMCI: viewed as being between the CM 210 and the CPE 240).

The WAN 280, and/or the Internet 290, is/are communicatively coupled to the CMTS 230 via a CMTS-NSI. The CMTS 230 is operable to support the external network termination, for one or both of the WAN 280 and the Internet 290. The CMTS 230 includes a modulator and a demodulator to support transmitter and receiver functionality to and from a CM network segment 299. The transmitter functionality within the CMTS 230 is operable to support uncorrelated code hopping functionality 231. It is also noted that there may be embodiments where the CM 210 is also operable to support uncorrelated code hopping functionality, as shown by a functional block 211.

A number of elements may be included within the CM network segment 299. For example, routers, splitters, couplers, relays, and amplifiers may be contained within the CM network segment 299 without departing from the scope and spirit of the invention. The CM network segment 299 allows communicative coupling between a CM user and the CMTS 230. FIG. 2 shows just one of many embodiments where the uncorrelated code hopping, performed according to the present invention, may be performed to provide for improved operation within a communication system.

FIG. 3A is a system diagram illustrating an embodiment of a cellular communication system 300A, according to the present invention. A mobile receiver 310 has a local antenna 311. The mobile receiver 310 may be any number of types of receivers including a cellular telephone, a wireless pager unit, a mobile computer having receiver functionality, or any other type of mobile receiver. The mobile receiver 310 receives a signal, using its local antenna 311, from a base station transmitter 340 via a wireless communication channel. The base station transmitter 340 is communicatively coupled to a transmitting wireless tower 349 to be able to transmit transmission to the local antenna 311 of the mobile receiver 310 that have been communicated via the wireless communication channel. The transmitting wireless tower 349 communicatively couples the transmitted signal from the base station transmitter 340.

The base station transmitter 340 is then able to support uncorrelated code hopping functionality according to the present invention, as shown in a functional block 341, on the transmitted signal. FIG. 3A shows yet another of the many embodiments where the uncorrelated code hopping, performed according to the present invention, may be performed to provide for improved operation within a communication system.

FIG. 3B is a system diagram illustrating another embodiment of a cellular communication system, according to the present invention. From certain perspectives, FIG. 3B may be viewed as being the reverse transmission operation of the cellular communication system 300A of FIG. 3A. A base station receiver 320 is communicatively coupled to a receiving wireless tower 321. The base station receiver 320, using its receiving wireless tower 321, receives a signal from a local antenna 339 via a wireless communication channel. The local antenna 339 is communicatively coupled to a mobile transmitter 330 so that the mobile transmitter 330 is able to transmit transmissions to the receiving wireless tower 321 of the base station receiver 320 that have been communicated via the wireless communication channel. The local antenna 339 communicatively couples the transmitted signal from the mobile transmitter 330. It is noted that the mobile transmitter 330 may be any number of types of transmitters including a cellular telephone, a wireless pager unit, a mobile computer having transmit functionality; or any other type of mobile transmitter.

The mobile transmitter 330 is then able to support uncorrelated code hopping functionality according to the present invention, as shown in a functional block 331, on the received signal. FIG. 3B shows yet another of the many embodiments where the uncorrelated code hopping functionality, performed according to the present invention, may be performed to provide for improved operation within a communication system.

It is also noted that the embodiments described above within FIGS. 3A and 3B may operate in conjunction within a single communication system.

That is to say, a mobile unit (that supports both transmit and receive functionality) may be implemented to support uncorrelated code hopping functionality during transmission of signals, while the base station device (that supports both transmit and receive functionality) may also be implemented to support uncorrelated code hopping functionality during transmission of signals. This way, both devices are operable to support the uncorrelated code hopping functionality according to the present invention at both ends of the communication link. This dual-end uncorrelated code hopping functionality is also true within other of the various embodiments described herein that illustrate both ends of a communication link.

Figure 4:
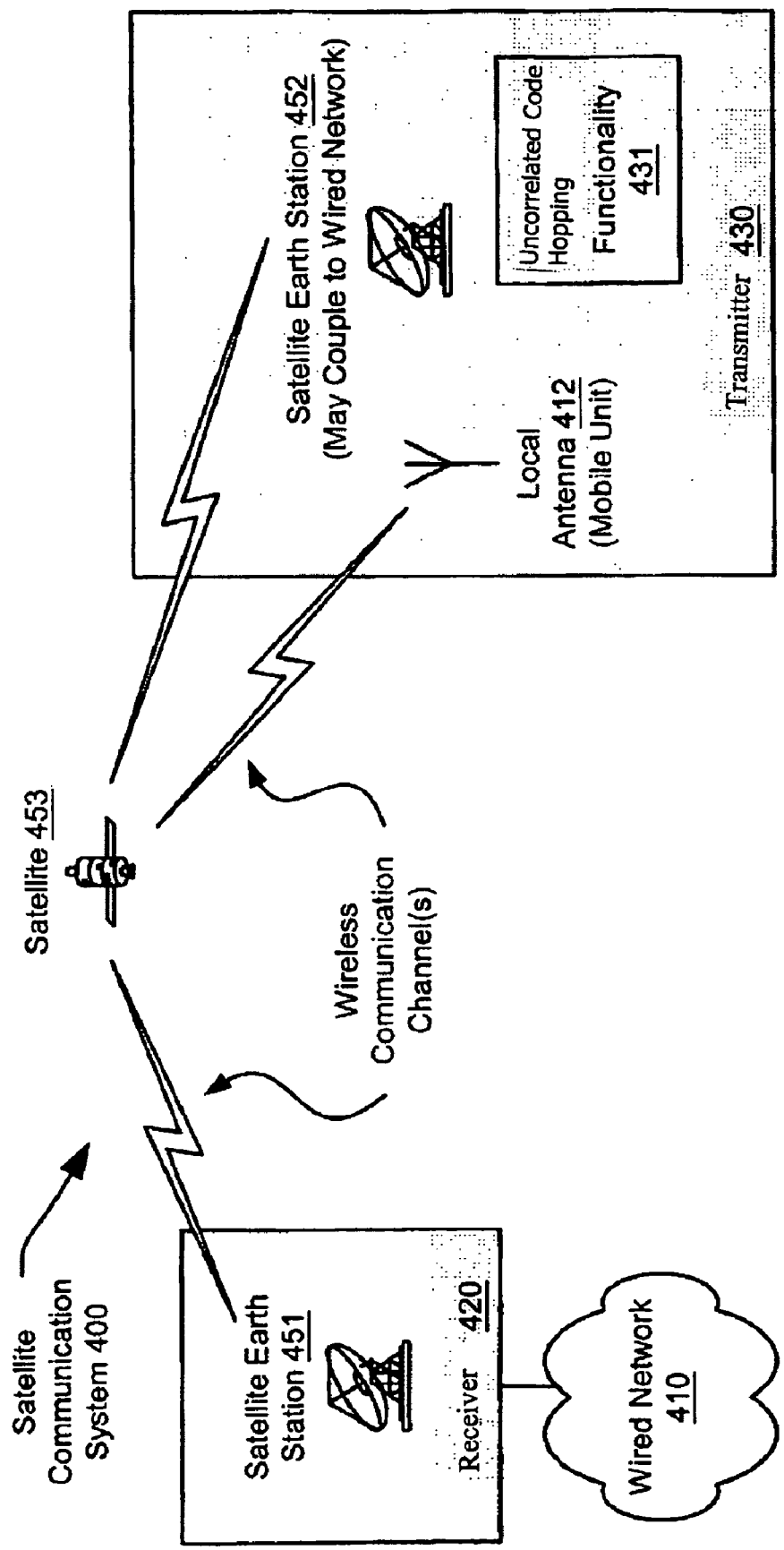
FIG. 4 is a system diagram illustrating an embodiment of a satellite communication system.

FIG. 4 is a system diagram illustrating an embodiment of a satellite communication system 400, according to the present invention. A receiver 420 is communicatively coupled to a wired network 410. The wired network 410 may include any number of networks including the Internet, proprietary networks, and other wired networks. The receiver 420 includes a satellite earth station 451 that is able to communicate to a satellite 453 via a wireless communication channel. The satellite 453 is able to communicate with a transmitter 430. The transmitter 430 is also located on the earth. Here, the communication to and from the satellite 453 may cooperatively be viewed as being a wireless communication channel, or each of the communication to and from the satellite 453 may be viewed as being two distinct wireless communication channels.

For example, the wireless communication "channel" may be viewed as now including multiple wireless hops in one embodiment. In other embodiments, the satellite 453 receives a signal received from the satellite earth station 452, amplifies it, and relays it to the receiver 420. The receiver 420 may include terrestrial receivers, such as satellite receivers, satellite based telephones, and satellite based Internet receivers, among other receiver types. In the case where the satellite 453 receives a signal received from the satellite earth station 452, amplifies it, and relays it, the satellite 453 may be viewed as being a "transponder." In addition, other satellites may exist that perform both receiver and transmitter operations. In this case, each leg of an up-down transmission via the wireless communication channel would be considered separately. The wireless communication channel between the satellite 453 and a fixed earth station would likely be less time-varying than the wireless communication channel between the satellite 453 and a mobile station.

In whichever embodiment, the satellite 453 communicates with the transmitter 430. The transmitter 430 may be viewed as being a mobile unit in certain embodiments (employing a local antenna 412). Alternatively, the transmitter 430 may be viewed as being a satellite earth station 452 that may be communicatively coupled to a wired network in a similar manner that the satellite earth station 451, within the receiver 420, communicatively coupled to a wired network. In both situations, the transmitter 430 is able to support uncorrelated code hopping functionality, as shown in a functional block 431, according to the present invention. For example, the transmitter 430 is able to perform uncorrelated code hopping, as shown in a functional block 431, on the signal transmitted to the satellite 453. FIG. 4 shows yet another of the many embodiments where the uncorrelated code hopping, performed according to the present invention, may be performed to provide for improved transmitter performance.

FIG. 5A is a system diagram illustrating an embodiment of a microwave communication system 500A, according to the present invention. A tower receiver 511 includes a wireless tower 515. The tower receiver 511, using its wireless tower 515, receives a signal from a tower transmitter 512 via a wireless communication channel. The tower transmitter 512 includes a wireless tower 516. The wireless tower 516 is able to transmit transmissions to the wireless tower 515 that have been communicated via the wireless communication channel. The tower transmitter 512 is then able to support uncorrelated code hopping functionality, as shown in a functional block 533. FIG. 5A shows yet another of the many embodiments where uncorrelated code hopping, performed according to the present invention, may be performed to provide for improved transmitter performance.

FIG. 5B is a system diagram illustrating an embodiment of a point-to-point radio communication system 500B, according to the present invention. A mobile unit 551 includes a local antenna 555. The mobile unit 551, using its local antenna 555, receives a signal from a local antenna 556 via a wireless communication channel. The local antenna 556 is included within a mobile unit 552. The mobile unit 552 is able to transmit transmissions to the mobile unit 551 that have been communicated via the wireless communication channel. The mobile unit 552 is then able to support uncorrelated code hopping functionality, as shown in a functional block 553, on the transmitted signal. FIG. 5B shows just yet another of the many embodiments where uncorrelated code hopping, performed according to the present invention, may be performed to provide for improved transmitter performance.

Figure 6:
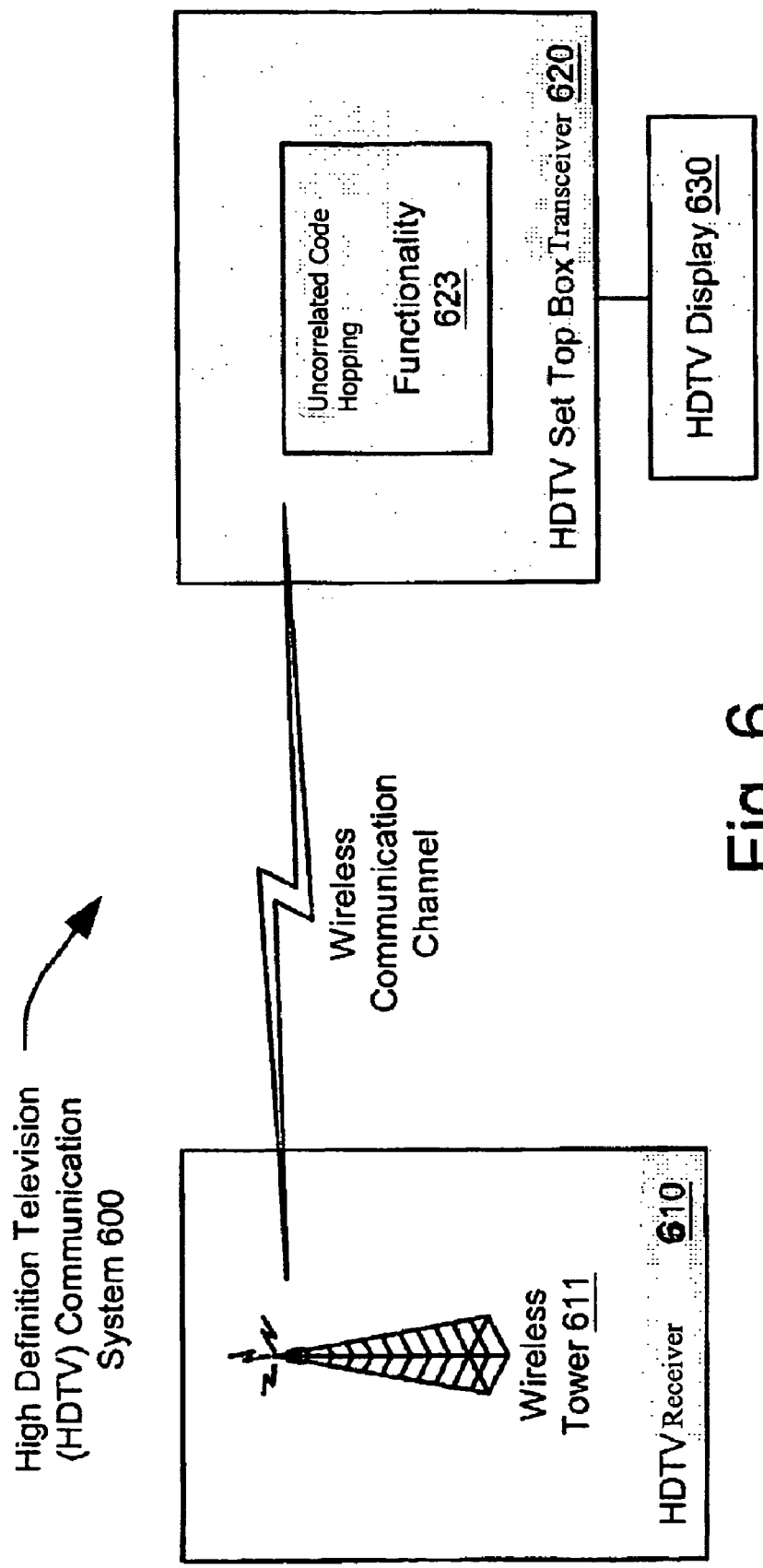
FIG. 6 is a system diagram illustrating an embodiment of a high definition (HDTV) communication system.

FIG. 6 is a system diagram illustrating an embodiment of a high definition (HDTV) communication system 600, according to the present invention. An HDTV receiver 610 includes a wireless tower 611. The HDTV receiver 610, using its wireless tower 611, receives a signal from an HDTV set top box transceiver 620 via a wireless communication channel. The HDTV set top box transceiver 620 includes the functionality to transmit a wireless transmitted signal. The HDTV set top box transceiver 620 is also communicatively coupled to an HDTV display 630 that is able to display a demodulated and decoded wireless received signals received by the HDTV set top box transceiver 620.

The HDTV set top box transceiver 620 is able to support uncorrelated code hopping functionality, as shown in a functional block 623 to provide for improved transmission performance. FIG. 6 shows yet another of the many embodiments where uncorrelated code hopping, performed according to the present invention, may be performed to provide for improved transmission performance.

Figure 7:
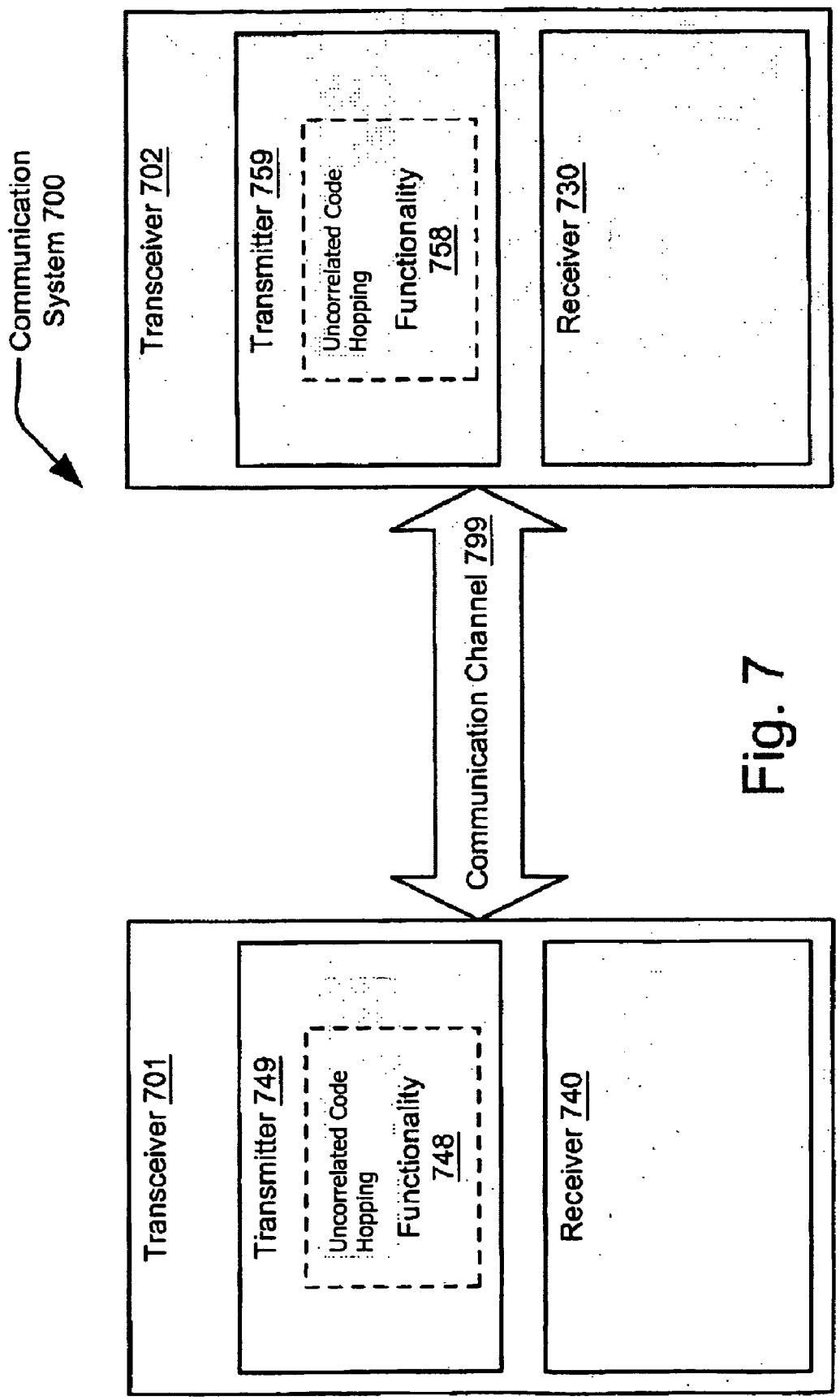
FIG. 7 is a system diagram illustrating an embodiment of a communication system.

FIG. 7 is a system diagram illustrating an embodiment of a communication system, according to the present invention. FIG. 7 shows communicative coupling, via a communication channel 799, between two transceivers, namely, a transceiver 701 and a transceiver 702. The communication channel 799 may be a wireline communication channel or a wireless communication channel.

Each of the transceivers 701 and 702 includes a transmitter and a receiver. For example, the transceiver 701 includes a transmitter 749 and a receiver 740 and the transceiver 702 includes a transmitter 759 and a receiver 730. The transmitters 749 and 759, within the transceivers 701 and 702, respectively, are each operable to support uncorrelated code hopping functionality according to the present invention. This will also allow improved signal processing for both of the transceivers 701 and 702. For example, the transmitter 749, within the transceiver 701, is able to support uncorrelated code hopping functionality, as shown in a functional block 748, on a signal that is to be transmitted from the transmitter 759 of the transceiver 702. Similarly, the transmitter 759, within the transceiver 702, is able to support uncorrelated code hopping functionality, as shown in a functional block 758, on a signal that is to be transmitted from the transmitter 759 of the transceiver 702.

FIG. 7 shows yet another of the many embodiments where uncorrelated code hopping, performed according to the present invention, may be performed to provide for improved performance.

Figure 8:
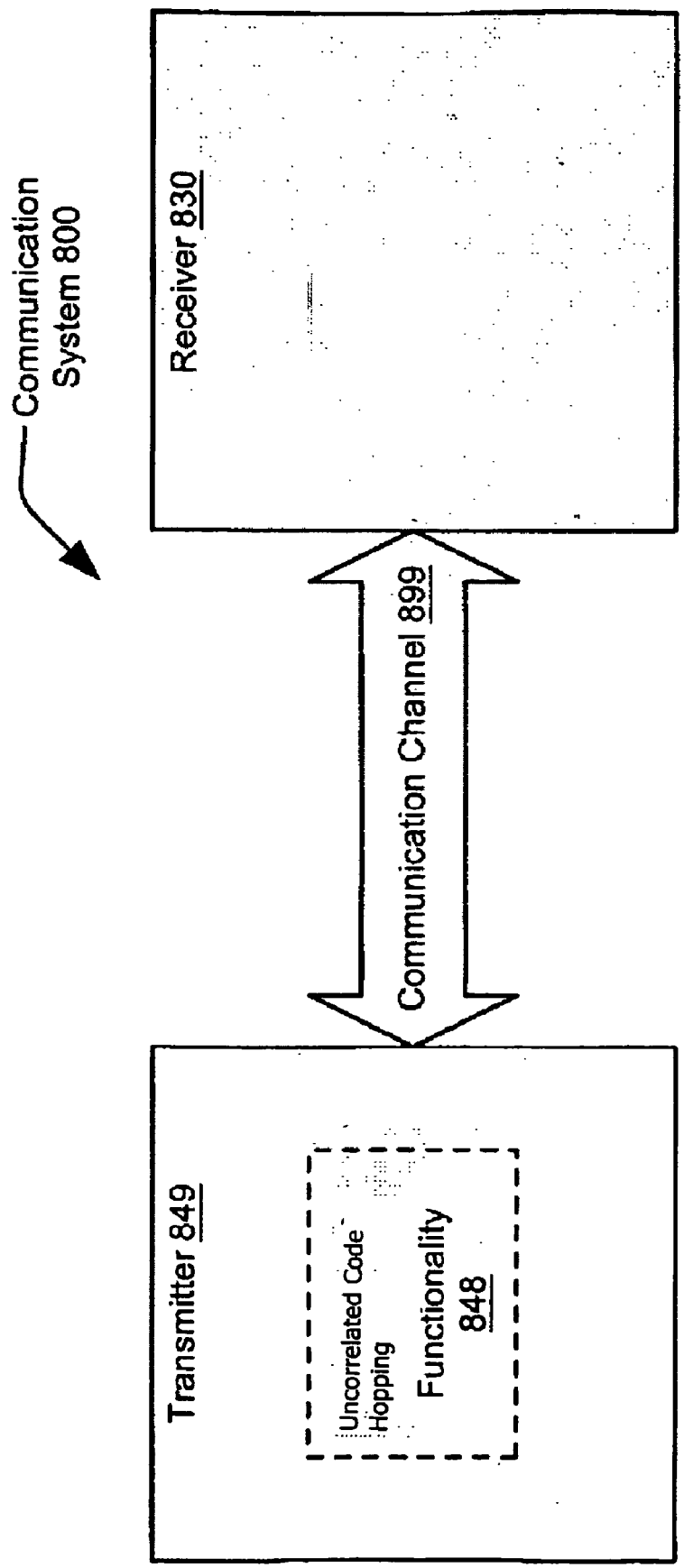
FIG. 8 is a system diagram illustrating another embodiment of a communication system.

FIG. 8 is a system diagram illustrating another embodiment of a communication system 800, according to the present invention. FIG. 8 shows communicative coupling, via a communication channel 899, between a transmitter 849 and a receiver 830. The communication channel 899 may be a wireline communication channel or a wireless communication channel. The transmitter 849 is also operable to support uncorrelated code hopping, as shown in a functional block 848, according to the present invention. FIG. 8 shows yet another of the many embodiments where uncorrelated code hopping, performed according to the present invention, may be performed to provide for improved performance.

Exemplary Systems and Methods to Perform Uncorrelated Code Hopping

Figure 9:
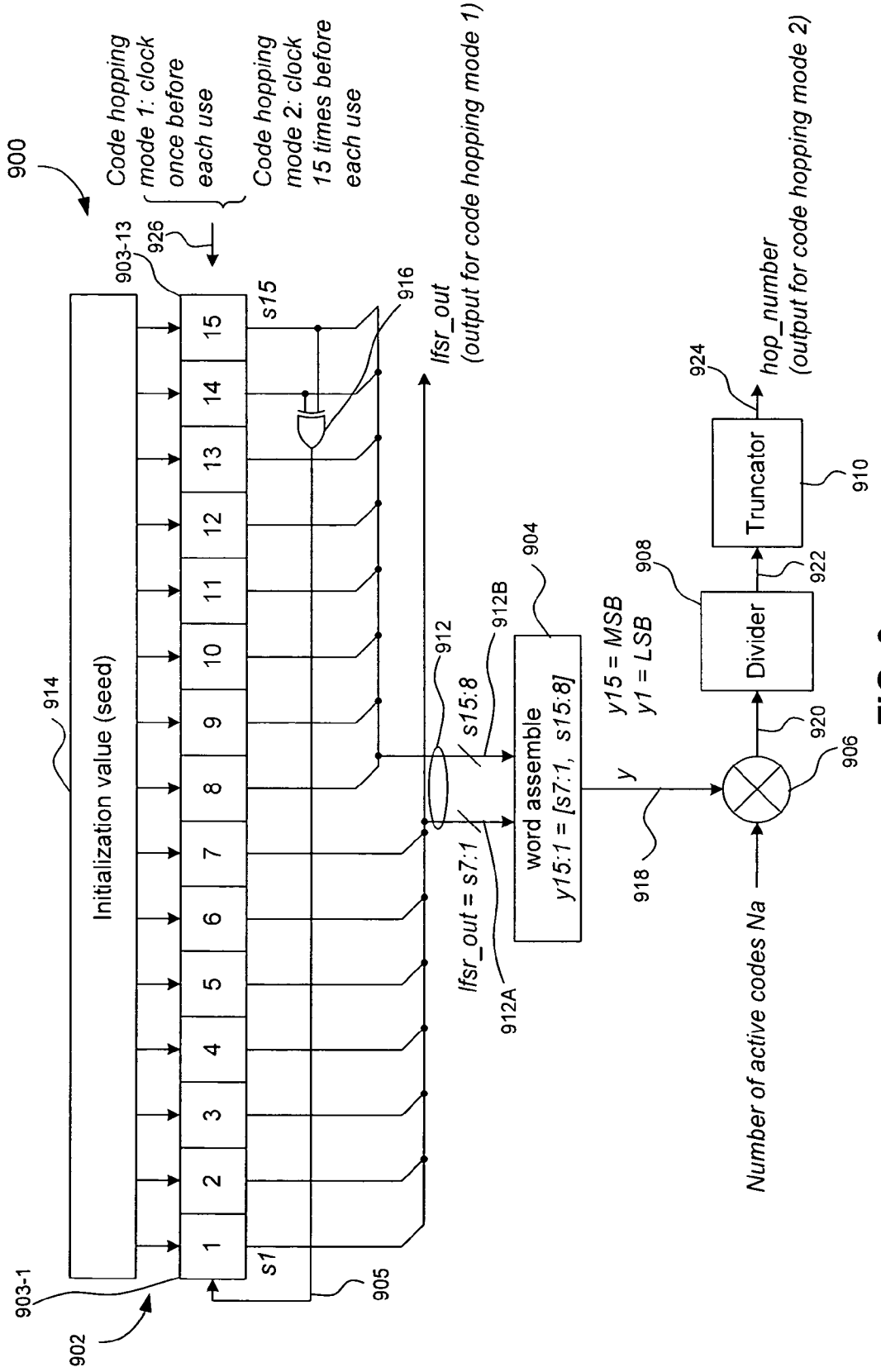
FIG. 9 shows a pseudo random (hop) number generating system.

FIG. 9 shows a pseudo random (hop) number generating system 900 (PRNG 900), according to one embodiment of the present invention. PRNG 900 includes a linear feedback shift register 902 (LFSR or shift register, all used interchangeably throughout), a word assembling device 904, a mixer (multiplier) 906, a divider (shifter) 908, and a truncator 910. PRNG 900 can be used in a cable modem, a transmitter in a data-over-cable system, or in one of the systems described above.

In operation, the initialization or seed data 914 is loaded periodically into shift register 902 or 1002 to give shift register 902 or 1002 an initial state. For example, data 914 is received from a headend of a cable modem (not shown). Data 914 is reloaded periodically. Each time data 914 is loaded, shift register 902 or 1002 is set back to a default position.

In one example, LFSR 902 is a 15-bit linear feedback shift register having 15 cells 903-1 to 903-15. LFSR 902 receives initialization value data (seed data or data) 914 and clocks the data 914 between 1 and 15 times, depending on a mode of the LFSR 902, between each code matrix transmission. LFSR 902 can function according to DOCSIS 2.0 standards (mode 1), and shift data 914 one time before each transmission of the code matrix. Alternatively, LFSR 902 can function according to mode 2, and shift data 914 fifteen times before each transmission of the code matrix. In one example, a clock can occur when each bit gets shifted to the right into the next cell 903 and the feedback 905 gets shifted into cell 903-1. A mode control signal 926 is used to place LFSR 902 into one of the desired modes above, or another desired mode.

Shift register 902 can include an exclusive OR gate 916 after cell 903-14 and 903-15, which logic result value feeds back around to cell 903-1. This configuration is used to ensure that shift register 902 shifts through every combination of bits before it rolls over, producing a maximal-length shift register sequence.

Word assembling device 904 can receive shifted data 912 from LFSR 902 and output an assembled fifteen bit word 918. A first part 912A of shifted data 912 can correspond to a least significant 7 digits (e.g., s7:1), while a second part 912B of shifted data 912 can correspond to a most significant 8 digits (e.g., s15:8). Word 918 can be assembled according to y15: 1=s7:1, s15:8. Alternatively, word assembly can be performed by taking the entire shift register value 912 in its natural order without performing any swapping of bits. However, this latter example may not allow for backward compatibility with DOCSIS 2.0.

Shift register value 912 is received at word assembling device 904.

For example, as discussed above, shift register value 912 can be comprised of first set or portion 912A and second set or portion 912B of data from respective cells 903-1 to 903-15, e.g., s7:1 and s:15:8. These can represent the least and most significant bit fields, which are put in an order that is specified by word assembling device 904. Word assembling device 904 outputs a 15 bit word 918, which is received at mixer 906. At mixer 906, word 918 is scaled, multiplied, or mixed by a number of active codes (Na), which can range from 64 to 128, for example. As is shown, mixed signal 920 output from mixer 906 includes 22 bits, which means that the result value maintains whole or full precision, which is discussed in more detail below.

It is to be appreciated that, although the 15 bit word 918 is mixed with the 8 bit Na, only 22 bits are included in mixed signal 920. This is because the 8 bit Na allows for 255 bits, however, only 128 bits are needed for the code matrix, so the $23^{rd}$ bit of signal 912 is not needed in this example.

Mixed signal 920 is divided, e.g., by 2^15, to produce divided signal 922. Divided signal 922 is truncated with a floor function in truncator 910 to produce a 7 bit pseudo random (hop) number 924. Random number (hop number Nh) 924 can be, for example, any number correlating to the number of active codes Na minus 1. Thus, if 120 active codes are used, random number 924 can be anything from 0 to 119. Random or hop number (Nh) 924 is used to address the code matrix. For example, whatever the random number 924 is, this value is used to as the bases for the circular shifting of the rows within the code matrix.

Figure 10:
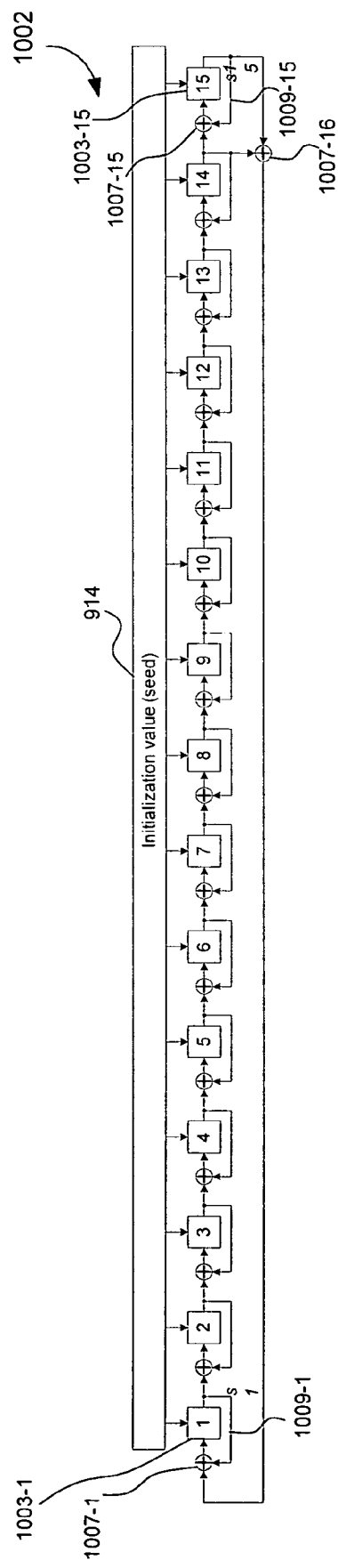
FIG. 10 shows a linear shift register which effects a 15-bit shift in a single clock cycle.

FIG. 10 shows an alternative shift register 1002 including cells 1003-1 to 1003-15. Instead of shifting bits to the next cell 1003, shift register 1002 performs logic (e.g., exclusive OR logic) on the bits using adders 1007-1 to 1007-16, and then shifts the logic result to the next respective cell 1003. This configuration allows for shifting the bits within shift register 1002 15 times during a single clock, instead of shifting the bits 15 times over 15 clocks as performed using shift register 902. Thus, when producing 15 clocks is not desired, e.g., the time necessary to produce 15 clocks is not desired, this configuration allows for performing one clock cycle on the shift register 1002 to result in an equivalent 15 bit shift. This is accomplished through performing the equivalent exclusive OR logic on signals 1009-1 to 1009-15 from each respective cell 1003-1 to 1003-15.

It can be desirable to delay a truncation operation until after a scaling process, i.e., maintain the whole or full precision of the result value until after the scaling operation. Scaling can be performed using elements 904, 906, and 908 so that integer arithmetic precision is maintained before truncation is performed by truncator 910. After the 15 bit word 918 is mixed with the 8 bit Na, a 22 bit result value 920 is produced. When only a 7 bit number is needed for random generated hop numbers (Nh) 924, some algorithms may truncate the result value 920 to 7 bits immediately after the multiplication. However, this is not always desirable. A more desired process is to truncate the result value at the end of the process, e.g., to not truncate the result before the final result value the random generated hop numbers (Nh) 924 is produced. This can allow for more variation in the result value, e.g., more variation in the random generated hop numbers (Nh) 924. This also can provide a kind of a dithering or smoothing affect on the result value (Nh) 924.

Thus, data in linear feedback shift register 902 or 1002 is shifted 15 times between transmissions. Comparatively, DOCSIS 2.0 only shifts once between transmissions. The additional shifting makes the random number used to shift the code matrix more uncorrelated with respect to subsequent and previous random numbers, i.e., the additional shifting removes the correlation in successive output samples. The code matrix is more uncorrelated because when a fifteen bit shift register is shifted by 1 bit, 14 of the bits are the same as they were before. However, when the fifteen bit shift register is shifted by 15 bits, all new bits are stored in the shift register 902 or 1002, as compared to a previous transmission cycle.

Figure 11:
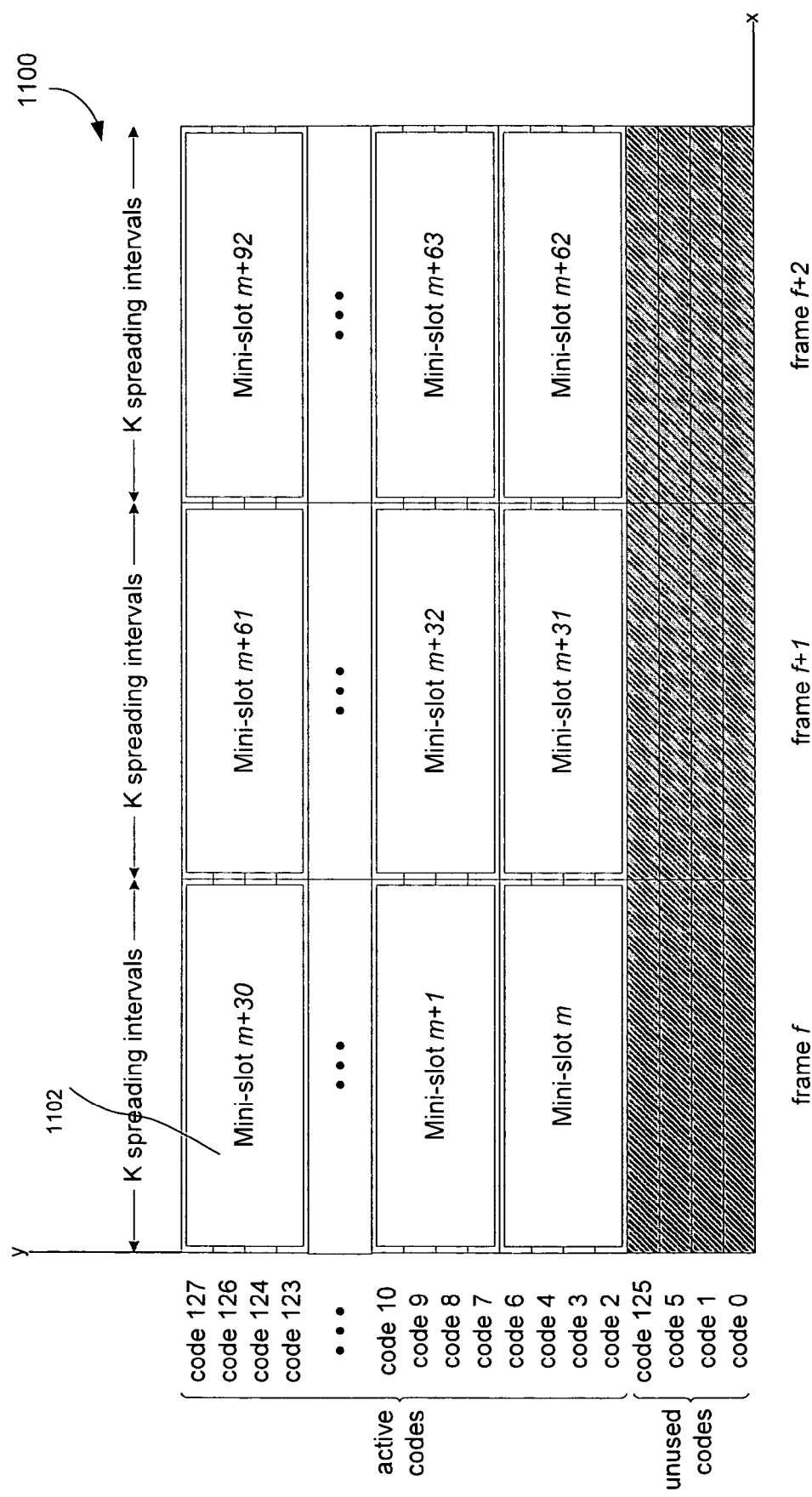
FIG. 11 shows mini-slot mapping with four codes per mini-slot.

FIG. 11 shows mini-slot mapping 1100 with a plurality of mini-slots 1102 (e.g., m, m+1, m+2, etc.), with four active codes per mini-slot 1102. K is the number of spreading intervals per frame, where a spreading interval is the length of the code in each row of the code matrix, e.g., 128 chips. In the example shown, the mini slots contain 4×K or 4K symbols. During each spreading interval, one QAM symbol is impressed upon the code with one QAM symbol on each code. K spreading intervals results in K symbols being sent on each code. A frame is defined as K spreading intervals. The bottom axis of the mini-slot mapping 1100, the X axis, is time. Time is expressed in frames or spreading intervals, each spreading interval being 128 bits. The Y axis of the mini-slot mapping 1100 is the code dimension. This shows which code is being used. In the configuration shown, mini slot m+30 is associated with codes 123, 124, 126, and 127, mini-slot m+1 is associated with codes 7-10, 10, and mini slot m is associated with codes 2, 3, 4, and 6 and four codes are located at the bottom of the code matrix, codes 0, 1, 5, and 125. The codes at the bottom of the code matrix are randomly selected codes that are not being used (e.g., inactive codes). In selectable active codes mode 2, the inactive codes remain at the bottom of the code matrix during permuting or hopping, such that only active codes are circularly shifted. This is in contrast to selectable active codes mode 1, which is used in DOCSIS 2.0, described earlier.

In an example when random or hop number (Nh) 924 is 5, codes 2-127 are active and are shifted by 5, so code 2 moves up 5 positions to where code 8 is now, code 3 moves up to where code 9 is now, code 4 moves up to where 10 is now, and so forth. The codes at the top, 122, 124, 126, and 127, are circularly shifted down to where codes 2, 3, 4, 6 and 7 are currently shown. The unused codes at the bottom of the code matrix would not participate in the shift of the rows on the code matrix in selectable active codes mode 2. This shifting occurs every spreading interval, which can occur 40,000 times per second, as discussed above. The codes are shifted based on the random number 924 that is generated by that PRNG 900, where every time shifting of the code matrix is done, it is based on a different random number 924.

As discussed above, the active codes are hopped, while the unused codes remain fixed at the bottom of the code matrix. A horizontal line in the following equation shows the division between active and unused codes.

The hopped spreading matrix in selectable active codes mode 2 is defined by:

$$C_k = \begin{bmatrix} C_{f(k,127),127} & C_{f(k,127),126} & \cdots & C_{f(k,127),0} \\ C_{f(k,126),127} & C_{f(k,126),126} & \cdots & C_{f(k,126),0} \\ \cdots & \cdots & \cdots & \cdots \\ C_{f(k,128-Na),127} & C_{f(k,128-Na),126} & \cdots & C_{f(k,128-Na),0} \\ \hline C_{u(k,128-Na-1),127} & C_{u(128-Na-1),126} & \cdots & C_{u(128-Na-1),0} \\ \cdots & \cdots & \cdots & \cdots \\ C_{u(0),127} & C_{u(0),126} & \cdots & C_{u(0),0} \end{bmatrix}$$

where, $$f(k,i) = \text{active\_code\_list}[\text{modulo}(2*Na\text{-}128\text{-hop\_number}(k)+i, N_a)] 128\text{-}N_a <= i <= 127$$

The code matrix elements $c_{i,j}$ are the elements of the original code matrix C, k indicates the spreading interval, i indicates the row in the code matrix, $N_a$ is the number of active codes, active_code_list is the list of active codes, in increasing order, with each element in the range 0 to 127, u is the list of unused codes, in increasing order, with each element in the range 0 to 127, and hop_number is a pseudo-random number.

In one example, $N_a$=124 active codes with unused code list u={0, 1, 5, 125}. Thus, active_code_list={2, 3, 4, 6, 7, 8, 9, 10, . . . , 123, 124, 126, 127}, as annotated at the left of the figure; active_code_list(0)=2, active_code_list(123)=127, u(0)=0, and u(3)=125. Assume that at a given spreading interval k, the pseudo-random hop generator returns a value of hop_number=0. (This results in the same matrix that would occur with code hopping turned off).

The spreading matrix $C_k$ consists of the unused codes at the bottom and active codes in increasing order on top:

$$C_k = \begin{bmatrix} \text{code } 127 \\ \text{code } 126 \\ \text{code } 124 \\ \text{code } 123 \\ \cdots \\ \text{code } 8 \\ \text{code } 7 \\ \text{code } 6 \\ \text{code } 4 \\ \text{code } 3 \\ \text{code } 2 \\ \hline \text{code } 125 \\ \text{code } 5 \\ \text{code } 1 \\ \text{code } 0 \end{bmatrix}$$

At another spreading interval, if hop_number=3, the active-code rows are cyclically shifted vertically by 3 rows, while the unused codes remain fixed, and the spreading matrix $C_k$ becomes:

$$C_k = \begin{bmatrix} \text{code } 123 \\ \text{code } 122 \\ \text{code } 121 \\ \text{code } 120 \\ \ldots \\ \text{code } 9 \\ \text{code } 8 \\ \text{code } 7 \\ \text{code } 6 \\ \text{code } 4 \\ \text{code } 3 \\ \text{code } 2 \\ \text{code } 127 \\ \text{code } 126 \\ \text{code } 124 \\ \overline{\text{code } 125} \\ \text{code } 5 \\ \text{code } 1 \\ \text{code } 0 \end{bmatrix}$$

The pseudo-random number generator 900, which determines the spreading matrix reordering during code hopping, utilizes the linear-feedback shift register (LFSR) 902 or 1002, shown in FIGS. 9 and 10, respectively.

For example, in order to align a CM's (not shown) code-hopping pseudo-random sequence with that of a CMTS (not shown), LFSR 902 or 1002 must output the following value 912A at the first spreading interval of each frame:

lfsr_out(frame_number*spreading_interval_per_fame)

where lfsr_out(k) is the value of lfsr_out, after k shift register updates, following the code hopping seed load 914 into the LFSR 902/1002. The bits are defined as lfsr_out7:1=s7:1, where s is the shift register contents, and lfsr_out bit 7 is considered the MSB. In code hopping mode 1, a shift register update equates to one shift of the LFSR 902/1002. In code hopping mode 2, a shift register update equates to 15 shifts of the LFSR 902/1002.

As discussed above, at reset 15-bit initialization or seed data 914 is loaded into the shift register 902/1002 and is used at the first spreading interval. The 15-bit seed value 914 may be configured in response to an Upstream Channel Descriptor message from the CMTS. At each subsequent spreading interval k (see FIG. 11), the LFSR 902/1002 is updated. The code hopping mechanism (LFSR and spreading interval index k) is advanced, every spreading interval (128 modulation intervals), in both spreader-on and spreader-off frames.

In code hopping mode 1, the LFSR 902/1002 is updated by clocking it once before each use on each spreading interval. The output lfsr_out 12A is used to compute the spreading matrix indices, as given by the equation for code hopping mode 1 above.

In code hopping mode 2, the LFSR 902/1002 is updated by clocking it 15 times before use on each spreading interval, thereby flushing it to reduce the correlation between hops. The LFSR output 912 is then scaled using mixer 906, divider 908, and truncator 910, to produce an approximately uniform distributed pseudo-random hop number 924 in the range 0 to $N_a-1$. The scaling includes the following operation:

$$\text{hop\_number} = \text{floor}\left(\frac{N_a y}{2^{15}}\right)$$

In this equation, $N_a$ is the number of active codes, and y is the result of word assembling device 904 assembling the output 912 of the LFSR 902/1002 into a 15-bit word 918, as discussed above.

For other exemplary communications systems that can use the uncorrelated code hopping systems and method, according to the embodiments of the present invention discussed above, please see co-owned U.S. Published Patent Applicants 2003/0185174, 2004/0068748, 2005/0002462, 2005/0097617, and 2005/0163196, and U.S. Pat. No. 6,778,611, which are all incorporated by reference herein in their entireties.

Figure 12:
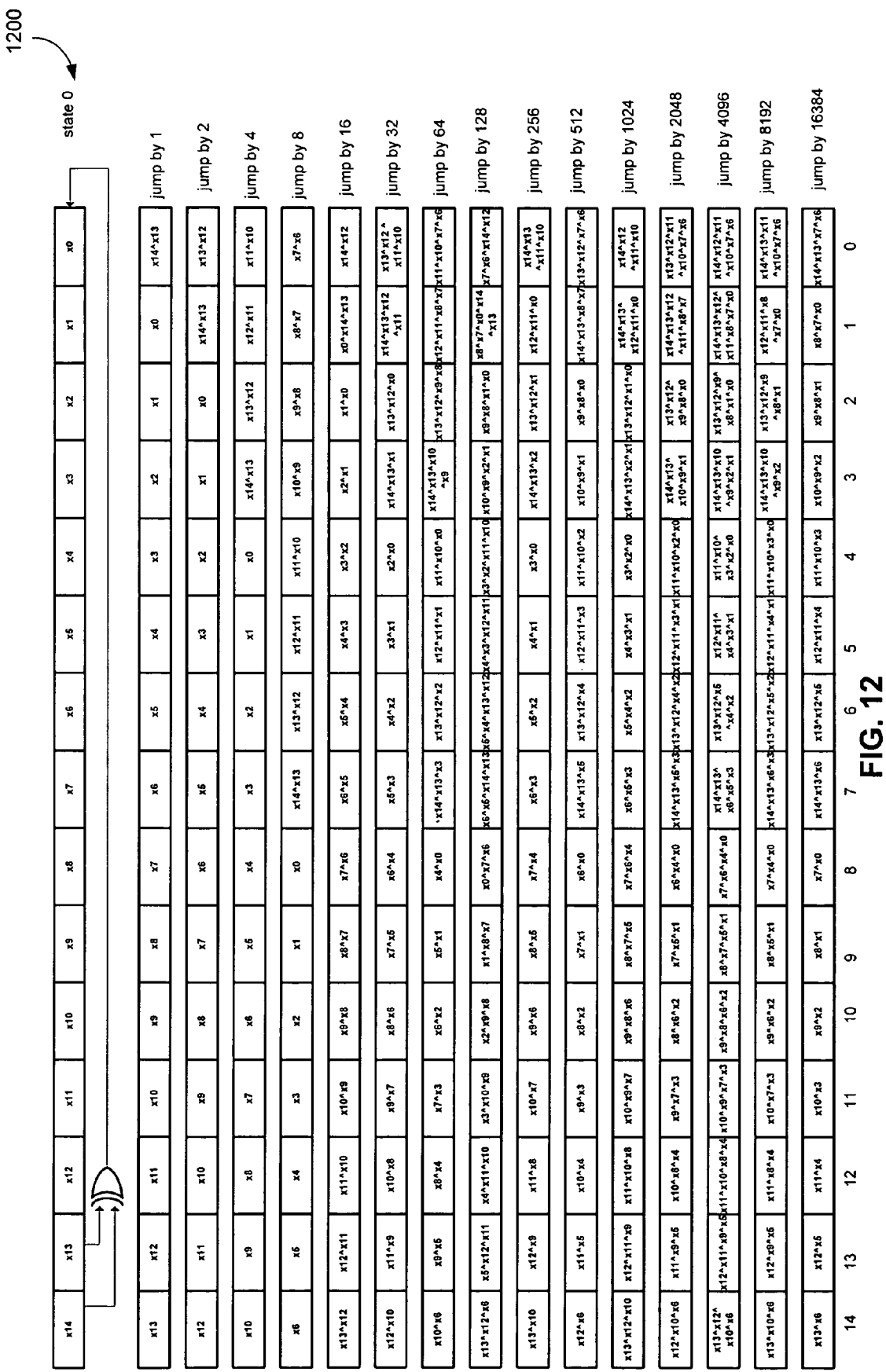
FIG. 12 shows a binary hopping scheme.

FIG. 12 shows a binary hopping scheme 1200 that can be implemented in an LFSR, for example in the LFSR 902 or 1002. In this alternative embodiment, instead of hopping by 1 or 15 states on the LFSR 902/1002, hopping can be performed by any number of states on each clock period. A binary hopper 1200 can include 15 rows. Each row is capable of hopping by a power of 2 number of clock cycles. For example, the first row has the ability to hop by $2^{\wedge}0=1$ clock, the second row can hop by $2^{\wedge}1=2$ clocks, and the last row can hop by $2^{\wedge}14=16,384$ clocks. Additionally, or alternatively, each row has can be bypassed, such that the row hops "0" clocks. Each row cascades into the row below it.

For example, a hop by 3 clocks is desired. To perform this hop, the hopping can be separated into power's of two to be a hop by 2 and a hop by 1.

The first two rows are configured to hop by 1 and 2 respectively, and all other rows are bypassed.

As another example, to hop by 15 is equivalent to a hop by 8, a hop by 4, a hop by 2, and a hop by 1. In this example, the first 4 rows would be configured for hopping, and the remaining rows would be bypassed.

Figure 13:
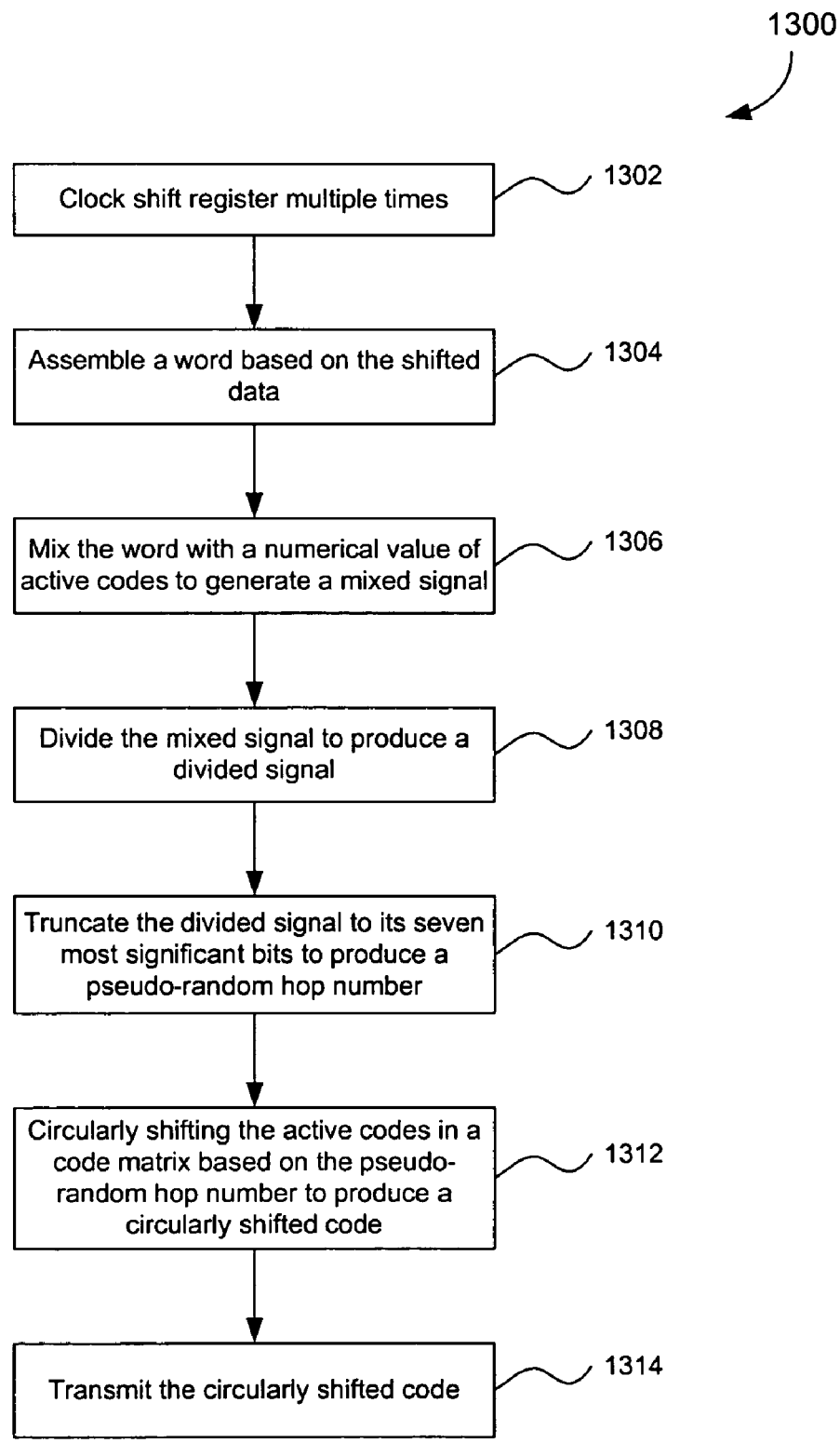
FIG. 13 is a flowchart depicting a method of code hopping including the generation of a pseudo-random hop number.

FIG. 13 is a flowchart depicting a method 1300, according to one embodiment of the present invention. In step 1302, a shift register is clocked multiple times (e.g., 15 times). In step 1304, a word is assembled based on the shifted data. In step 1306, the word is mixed with a numerical value of active codes to generate a mixed signal. In step 1308, the mixed signal is divided to produce a divided signal. In step 1310, the divided signal is truncated to its seven most significant bits to produce a pseudo random hop number. In step 1312, the pseudo random hop number is used to circularly shift the active codes in a code matrix to produce a circularly shifted code. In step 1314, the circularly shifted code is transmitted.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A system, comprising:
    a multi-bit linear shift register that receives data, the data being clocked multiple times;
    a word assembler that receives the shifted data and outputs a fifteen bit word;
    a mixer that mixes the fifteen bit word with a numerical value of active codes to generate a mixed signal;
    a divider that divides the mixed signal to produce a divided signal;
    a truncator that truncates the divided signal to its seven most significant bits to produce a pseudo random hop number;
    a code matrix shifter that circularly shifts the active codes in a code matrix based on the pseudo random hop number to produce a circularly shifted code; and
    a transmitter that transmits the circularly shifted code.

2. The system of claim 1, wherein the multi-bit linear shift register is configured to be clocked fifteen times to shift the data fifteen bits.

3. The system of claim 1, further comprising:
    a node in a synchronous code-division multiple access communications system that comprises the multi-bit linear shift register, the word assembler, the mixer, the divider, the truncator, the code matrix, and the transmitter.

4. The system of claim 1, wherein the word assembler is configured to form each word as y15:1=[s7:1, s15:8], such that s7:1 are seven most significant bits and s15:8 are eight least significant bits of the shifted data.

5. The system of claim 1, wherein the code matrix shifter is configured shift the active codes according to:
    $f(k,i)$=active_code_list[modulo(2*Na-128-hop_number(k)+i, Na)],
    wherein:
    the code matrix elements $c_{i,j}$ are the elements of the code matrix,
    k indicates a spreading interval,
    i indicates a row in the code matrix,
    Na is the numerical value of active codes,
    active_code_list is a list of the active codes, in increasing order, with each element in a range 0 to 127,
    u is a list of unused codes in the code matrix, in increasing order, with each element in a range 0 to 127,
    hop_number is the pseudo random hop number, and
    $128-Na \leq i \leq 127$.

6. The system of claim 1, wherein the transmitter is configured to mix a symbol or a quadrature amplitude modulated symbol with respective rows of the code matrix before transmitting the code matrix.

7. The system of claim 1, wherein the multi-bit linear shift register is configured to hop by a power of 2 number of clock cycles in a binary hopping scheme.

8. The system of claim 1, wherein the multi-bit linear shift register is configured to be clocked one time to shift the data fifteen bits.

9. The system of claim 8, further comprising a feedback path across each cell of the fifteen-bit linear shift register.

10. A method, comprising:
    clocking a shift register multiple times;
    assembling a word based on the shifted data;
    mixing the word with a numerical value of active codes to generate a mixed signal;
    dividing the mixed signal to produce a divided signal;
    truncating the divided signal to its seven most significant bits to produce a pseudo random hop number;
    circularly shifting the active codes in a code matrix based on the pseudo random hop number to produce a circularly shifted code; and
    transmitting the circularly shifted code.

11. The method of claim 10, wherein the shifting step occurs over fifteen clock cycles.

12. The method of claim 10, wherein the shifting step occurs over one clock cycle.

13. The method of claim 10, wherein each word is formed as y15:1=[s7:1, s15:9], such that s7:1 are seven most significant bits and s15:9 are eight least significant bits of the shifted data.

14. The method of claim 10, wherein the circularly shifting of the active codes occurs according to:
    $f(k,i)$=active_code_list[modulo(2*Na-129-hop_number(k)+i, Na)],
    wherein:
    the code matrix elements $c_{i,j}$ are the elements of the code matrix,
    k indicates a spreading interval,
    i indicates a row in the code matrix,
    Na is the numerical value of active codes,
    active_code_list is a list of the active codes, in increasing order, with each element in a range 0 to 127,
    u is a list of unused codes in the code matrix, in increasing order, with each element in a range 0 to 127,
    hop_number is the pseudo random hop number, and
    $129-Na \leq i \leq 127$.

15. The method of claim 10, wherein before the transmitting step a symbol or quadrature amplitude modulated symbol is mixed with respective rows of the circularly shifted code matrix.

16. The method of claim 10, wherein the shifting step comprises a binary hopping scheme.

* * * * *